(12) United States Patent
Nishihara et al.

(10) Patent No.: US 7,373,392 B2
(45) Date of Patent: May 13, 2008

(54) FILE TRANSFER DATA SETTING DEVICE (75) Inventors: Masahiro Nishihara, Nagoya (JP); Masashi Kuno, Oobu (JP)

(73) Assignee: Brother Kogyo Kabushiki Kaisha, Nagaya (JP)

( * ) Notice: Subject to any disclaimer, the term of this patent is extended or adjusted under 35 U.S.C. 154(b) by 828 days.

(21) Appl. No.: 10/424,754

(22) Filed: Apr. 29, 2003

(65) Prior Publication Data

US 2003/0208565 A1 Nov. 6, 2003

(30) Foreign Application Priority Data

May 1, 2002 (JP) .............................. 2002-129839

(51) Int. Cl.
*G06F 15/16* (2006.01)
(52) U.S. Cl. ...................... 709/217; 709/203; 709/216; 709/219; 709/228; 709/232
(58) Field of Classification Search ................ 709/216, 709/217, 228, 292, 203, 219, 232
See application file for complete search history.

(56) References Cited

U.S. PATENT DOCUMENTS

| 5,832,524 | A | * | 11/1998 | Jarvenpaa | .................... | 707/202 |
| 5,920,701 | A | * | 7/1999 | Miller et al. | ................. | 709/228 |
| 6,272,547 | B1 | * | 8/2001 | McWilliams | ................ | 709/232 |
| 6,385,654 | B1 | | 5/2002 | Tanaka | | |
| 6,850,962 | B1 | * | 2/2005 | Povolny et al. | ............. | 709/219 |
| 7,115,919 | B2 | * | 10/2006 | Kodama | ..................... | 707/206 |
| 7,159,005 | B1 | * | 1/2007 | Baber et al. | ................ | 709/217 |
| 2003/0191811 | A1 | * | 10/2003 | Hashem et al. | ............. | 709/216 |

FOREIGN PATENT DOCUMENTS

| DE | 000773503 A2 * | 5/1997 |
| JP | A 07-131502 | 5/1995 |
| JP | A 10-240603 | 9/1998 |
| JP | A 10-307745 | 11/1998 |
| JP | A 11-143760 | 5/1999 |

OTHER PUBLICATIONS

U.S. Appl. No. 10/424,691, filed Apr. 29, 2003, Miyake et al.

* cited by examiner

*Primary Examiner*—Ario Etienne
*Assistant Examiner*—Ramy M Osman
(74) *Attorney, Agent, or Firm*—Oliff & Berridge PLC (57) ABSTRACT In order for the user to set new file transfer data, the image file transfer setting unit 30 acquires authentication data from a file transfer data table and displays a list of connections on the display unit 40. Next, the user uses the input unit 42 to select a desired connection from the list and also to input or select a folder 12 to be the transfer source and a hot folder 24 to be the transfer destination. The image file transfer setting unit 30 combines this data as new file transfer data and adds the data to the file transfer data table. In this way, the user can set new file transfer data using authentication data included in preset file transfer data, thereby facilitating the setting of file transfer data and the management of server authentication data.

7 Claims, 10 Drawing Sheets

TABLE OF FILE TRANSFER DATA — T1

| SETTING | SERVER | LOGIN NAME | PASSWORD | PROTOCOL | SOURCE | DESTINATION | POST-PROCESS |
|---|---|---|---|---|---|---|---|
| ENLARGE 200% | Server1 | anonymous | abc@domain | AT | a:/tmp/ | d:/enlarge 200% | DELETE |
| SAMPLE | Server2 | anonymous | mail@domain | ftp | b:/tmp/ | d:/sample | .bak |
| ENLARGE Ume | Ume | UEDA | 0123 | ftp | c:/data/large | d:/enlarge | .bak |
| STANDARD Ume | Ume | TAKA | aabb | ftp | c:/data/std | d:/standard | .bak |
| REDUCE Ume | Ume | UEDA | 0123 | ftp | c:/data/small | d:/reduce | .bak |
| ENLARGE Matsu | matsu | UEDA | 4567 | win | e:/tmp/wide | d:/enlarge | e:/store |
| REDUCE Matsu | matsu | UEDA | 4567 | win | e:/tmp/normal | d:/standard | e:/store |

FIG. 2(a)

INITIAL WINDOW IN PROCESS FOR SETTING FILE TRANSFER DATA (1)

FIG. 2(b)

CONNECTION SETTINGS WINDOW

FIG. 2(c)

FILE TRANSFER DATA SETTINGS WINDOW

INITIAL WINDOW IN PROCESS FOR SETTING FILE TRANSFER DATA (2)

FIG. 2(f)

ADVANCED SETTINGS WINDOW

TABLE OF FILE TRANSFER DATA

| SETTING | SERVER | LOGIN NAME | PASSWORD | PROTOCOL | SOURCE | DESTINATION | POST-PROCESS |
|---|---|---|---|---|---|---|---|
| ENLARGE 200% | Server1 | anonymous | abc@domain | AT | a:/tmp/ | d:/enlarge 200% | DELETE |
| SAMPLE | Server2 | anonymous | mail@domain | ftp | b:/tmp/ | d:/sample | .bak |
| ENLARGE Ume | Ume | UEDA | 0123 | ftp | c:/data/large | d:/enlarge | .bak |
| STANDARD Ume | Ume | TAKA | aabb | ftp | c:/data/std | d:/standard | .bak |
| REDUCE Ume | Ume | UEDA | 0123 | ftp | c:/data/small | d:/reduce | .bak |
| ENLARGE Matsu | Matsu | UEDA | 4567 | win | e:/tmp/wide | d:/enlarge | e:/store |
| REDUCE Matsu | Matsu | UEDA | 4567 | win | e:/tmp/normal | d:/standard | e:/store |
| | | | | | | | |

FILE TRANSFER DATA SETTING DEVICE

BACKGROUND OF THE INVENTION

1. Field of the Invention

The present invention relates to a file transfer data setting device used in a file transfer system for transferring files based on file transfer data.

2. Description of Related Art

A file transfer system for transferring files from a server to a client is well known in the art. One example of this file transfer system is disclosed in Japanese unexamined patent application publication No. HEI-11-143760.

This type of file transfer system transfers files based on preset file transfer data. This file transfer data includes transfer source data, such as an address indicating a folder on a server to be the transfer source of a file; transfer destination data, such as an address indicating a folder on a client to be the transfer destination for a file; and authentication data required by the client to receive authentication from the server in order to access the server.

SUMMARY OF THE INVENTION

However, when a user installs a new storage medium, such as a hard disk and the like on the server and sets a new transfer folder, the user has to set new file transfer data. The user has to perform a complex operation each time by inputting data indicative of the new transfer source and destination for the file, as well as server authentication data for the server transfer source.

Further, to perform these settings, all the users of the system have to know the authentication data of the server, making the security management of authentication data difficult.

In view of the foregoing, it is an object of the present invention to provide a file transfer data setting device that facilitates the setting of file transfer data and the management of server authentication data.

In order to attain the above and other objects, the present invention provides a file transfer data setting device for setting file transfer data to be used for transferring a file from a server to a client, the file transfer data setting device comprising: a storing portion storing at least one set of file transfer data, each set of file transfer data including a set of transfer source data, a set of transfer destination data, and a set of server authentication data, the transfer source data set indicating a server storage area that is provided on a server and that serves as a source of a file to be transferred, the transfer destination data set indicating a client storage area that is provided on a client and that serves as a destination to transfer the file, the server authentication data being used for causing the server to permit an access to the subject server; a notifying portion notifying a user of at least a part of the at least one set of server authentication data from among the at least one set of file transfer data stored by the storing portion; an input portion enabling a user to input a set of transfer source data indicating the user's desired server storage area, from which the user desires to transfer a file, and to input a set of transfer destination data indicating the user's desired client storage area, to which the user desires to transfer the file, the input portion enabling the user to select one set of server authentication data, the at least a part of which is notified by the notifying portion and which corresponds to a server, in which the user's desired server storage area is located; and a file transfer data setting portion adding the selected authentication data, the inputted transfer source data, and the inputted transfer destination data in association with each other in the storing portion as a set of new file transfer data.

According to another aspect, the preset invention provides a file transfer data setting program executed by a computer for setting file transfer data to be used for transferring a file from a server to a client, the computer including a storing portion storing at least one set of file transfer data, each set of file transfer data including a set of transfer source data, a set of transfer destination data, and a set of server authentication data, the transfer source data set indicating a server storage area that is provided on a server and that serves as a source of a file to be transferred, the transfer destination data set indicating a client storage area that is provided on a client and that serves as a destination to transfer the file, the server authentication data being used for causing the server to permit an access to the subject server, the file transfer data setting program comprising the programs of: notifying a user of at least a part of the at least one set of server authentication data from among the at least one set of file transfer data stored by the storing portion; enabling a user to input a set of transfer source data indicating the user's desired server storage area, from which the user desires to transfer a file, to input a set of transfer destination data indicating the user's desired client storage area, to which the user desires to transfer the file, and to select one set of server authentication data, the at least a part of which is notified by the notifying portion and which corresponds to a server, in which the user's desired server storage area is located; and adding the selected authentication data, the inputted transfer source data, and the inputted transfer destination data in association with each other in the storing portion as a set of new file transfer data.

According to a further aspect, the present invention provides a storage medium that can be read by a computer and that stores a file transfer data setting program to be executed by a computer for setting file transfer data to be used for transferring a file from a server to a client, the computer including a storing portion storing at least one set of file transfer data, each set of file transfer data including a set of transfer source data, a set of transfer destination data, and a set of server authentication data, the transfer source data set indicating a server storage area that is provided on a server and that serves as a source of a file to be transferred, the transfer destination data set indicating a client storage area that is provided on a client and that serves as a destination to transfer the file, the server authentication data being used for causing the server to permit an access to the subject server, the file transfer data setting program comprising the programs of: notifying a user of at least a part of the at least one set of server authentication data from among the at least one set of file transfer data stored by the storing portion; enabling a user to input a set of transfer source data indicating the user's desired server storage area, from which the user desires to transfer a file, to input a set of transfer destination data indicating the user's desired client storage area, to which the user desires to transfer the file, and to select one set of server authentication data, the at least a part of which is notified by the notifying portion and which corresponds to a server, in which the user's desired server storage area is located; and adding the selected authentication data, the inputted transfer source data, and the inputted transfer destination data in association with each other in the storing portion as a set of new file transfer data.

BRIEF DESCRIPTION OF THE DRAWINGS

The above and other objects, features and advantages of the invention will become more apparent from reading the following description of the preferred embodiments taken in connection with the accompanying drawings in which:

FIGS. 2(a)-2(f) are explanatory diagrams showing windows displayed during a process for setting file transfer data executed by an image file transfer setting unit in the image processing system of FIG. 1, wherein FIG. 2(c) shows a process window for setting file transfer data.

DETAILED DESCRIPTION OF THE PREFERRED EMBODIMENT

A file transfer data setting device according to a preferred embodiment of the present invention will be described while referring to the accompanying drawings wherein like parts and components are designated by the same reference numerals to avoid duplicating description.

Figure 1:
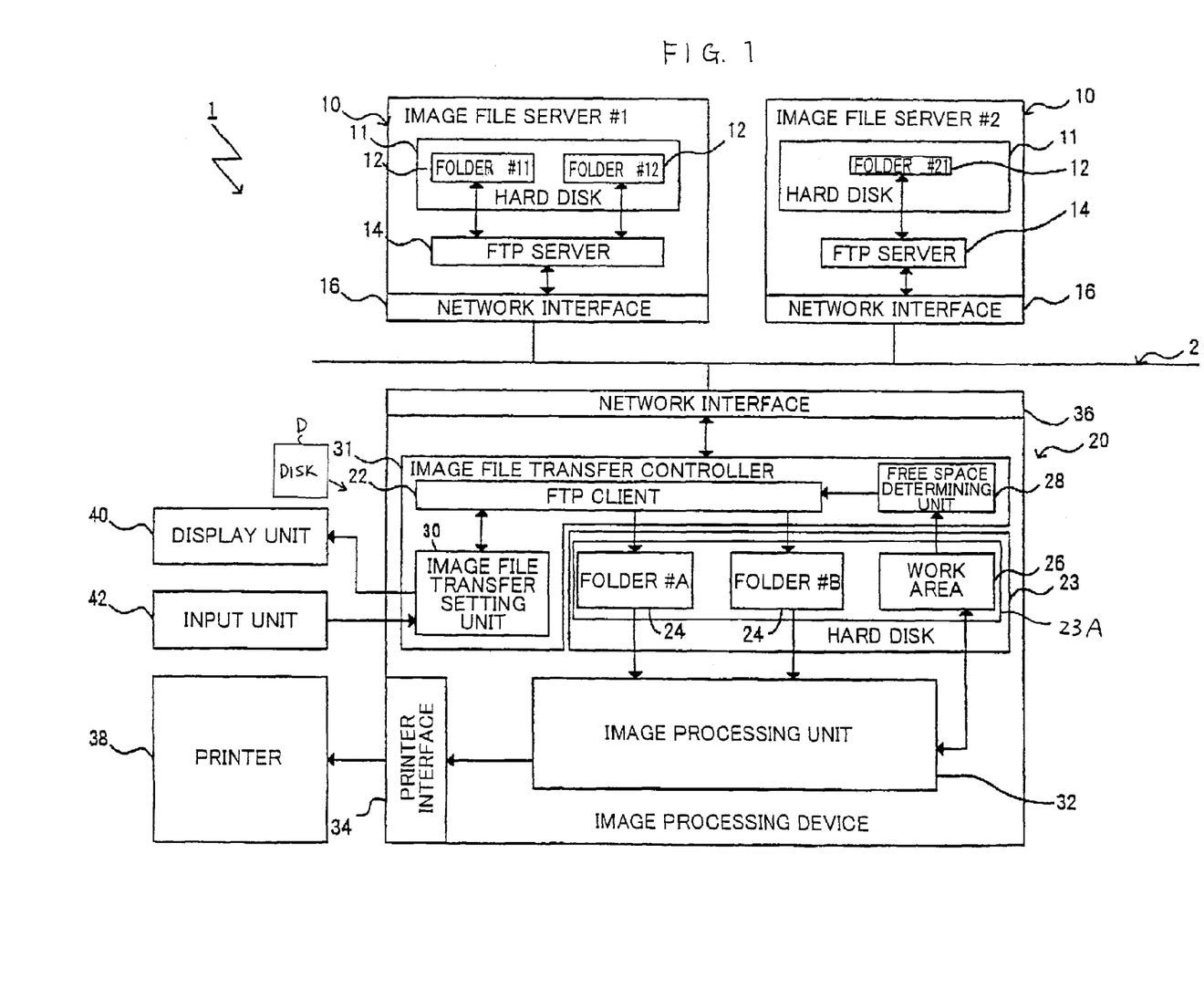
FIG. 1 is a block diagram showing the overall construction of an image processing system according to a preferred embodiment of the present invention.

FIG. 1 is a block diagram showing the overall construction of an image processing system according to the present embodiment and the functional construction of each component of the system.

An image processing system 1 of the preferred embodiment includes: image file servers 10 that are personal computers or the like; and an image processing device 20 that is also a personal computer or the like. The image file servers 10 are connected to the image processing device 20 via a network 2, such as a local area network. While two image file servers 10 are connected to the network 2 in FIG. 1, the number of image file servers 10 is not limited to two.

Each of the image file servers 10 includes: a hard disk 11, an FTP server 14, and a network interface 16 connected to the network 2. Folders 12 (transfer storage areas) are provided on the hard disk 11 as storage areas for storing image files to be transferred. The image file server 10 called the image file server #1 in FIG. 1 is provided with two folders 12 (folder #11, #12), but is not limited to two. The image file server 10 called the image file server #2 is provided with a single folder 12 (folder #21). The folders 12 can also be provided elsewhere other than on the hard disk.

The FTP server 14 receives image files from other image file servers 10 via the network interface 16 and stores the files in the folders 12. The FTP server 14 can also extract image files from the folders 12 and can transmit these files to other image file servers 10 or the image processing device 20 via the network interface 16. This FTP server 14 can be implemented as a process executed by a microcomputer component in the image file server 10.

In addition, each image file server 10 is provided with a process executing unit (not shown) for executing various processes using a mouse, keyboard, display, speakers, external storage devices, and the like (not shown).

The image processing device 20 includes: an image file transfer controller 31; a hard disk 23; an image processing unit 32; a network interface 36; and a printer interface 34. The image file transfer controller 31 includes: a FTP (File Transfer Protocol) client 22, a free space determining unit 28, and an image file transfer setting unit 30.

It is noted that the hard disk 23 has a predetermined usable area (a "C" drive, for example) 23A having a fixed amount of capacity. The hot folders 24 (folders #A and #B, in this example) can be provided in the usable area 23A. The hot folders (processing storage area) 24 are storage areas for receiving and temporarily storing image files transferred from the folders 12 in the image file servers 10. A work area 26 is provided in a free space in the usable area 23A at its region other than the region where the hot folders 24 (folders #A and #B) are established. Accordingly, the capacity of the work area 26 changes according to the data amount of image files that have been transferred from the image file servers 10 and that are being temporarily stored in the hot folders 24.

The network interface 36 is connected to the network 2. The FTP client 22 is for controlling the transfer of image files and for judging whether data files exist in the folders 12 in the image file servers 10. The free space determining unit 28 is for determining whether the work area 26 meets or exceeds a required capacity C. The image file transfer setting unit 30 is for setting file transfer data indicative of the transfer source and destination of image files. The image file transfer setting unit 30 is connected to a display unit 40, such as a monitor, and an input unit 42, such as a keyboard, mouse, or the like. The image processing unit 32 is for performing image processing on image files transferred to and stored in the hot folders 24. The printer interface 34 is connected to a printer 38.

It is noted that the hot folders 24 are used by a raster image process (RIP) system. When image files are copied into these hot folders 24 and an image processing program is executed by the image processing unit 32, the files are automatically extracted, processed, and outputted on the printer 38.

In this description, two of the hot folders 24 and one work area 26 are established in the hard disk 23. However, the numbers of the hot folders 24 and the work area 26 are not limited to these numbers.

The hot folders 24 and work area 26 can be established in a usable area in one or more memory unit (not shown) other than the hard disk 23. Also in such a case, the work area 26 can be defined as a free space provided in the usable area at a location other than the hot folders 24.

The FTP client 22, free space determining unit 28, image file transfer setting unit 30, and image processing unit 32 are implemented by processes executed by a microcomputer component of the image processing device 20.

The image processing device 20 is also provided with a process executing unit (not shown) for executing various processes using a mouse, keyboard, display, speakers, external storage devices, and the like (not shown).

The image file transfer setting unit 30 is used for setting data (file transfer data) required to transfer image files from the image file servers 10 to the image processing device 20. More specifically, the image file transfer setting unit 30 creates a new set of file transfer data and adds the newly-created set of file transfer data in a file transfer data table T1 shown in FIG. 5 in the hard disk 23 or the like. One set of file transfer data includes: transfer source data indicative of a folder 12 (source), from which an image file is desired to be transferred; transfer destination data indicative of a hot folder 24 (destination), to which the image file is desired to be transferred; and authentication data for an image file server 10 on which the folder 12 indicated by the transfer source data is located.

The authentication data for one image file server 10 is used by the image processing device 20 to try accessing the subject image file server 10. More specifically, when trying to access an image file server 10, the image processing device 20 transmits the authentication data to the image file server 10. The image file server 10 judges the authentication data, and based on the judged result, sends authentication to the image processing device 20 to permit the image processing device 20 to access the image file server 10. The authentication data for one image file server 10 includes: data of the address of the subject image file server 10; and data of a login name and a password that are used by the image processing device 20 to access the subject image file server 10.

Figure 2A:
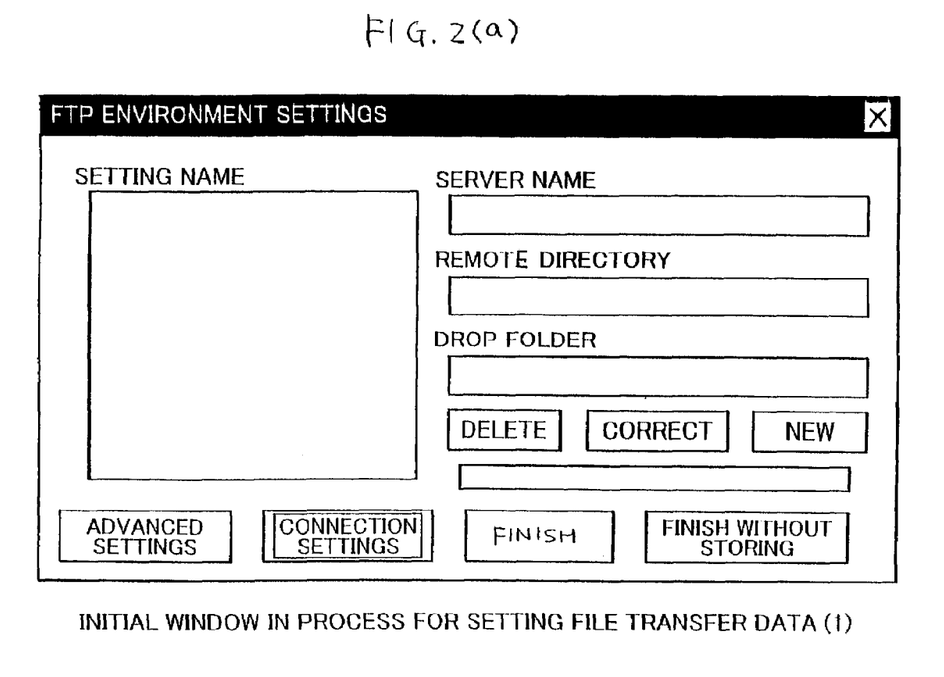
FIG. 2(a) shows an initial window in the process.

It is noted that a user sometimes sets new file transfer data designating new file-transfer operation from his/her desired transfer source to his/her desired transfer destination. For example, when the user installs a new storage area (folder) in some image server 10, he/she has to set new file transfer data designating his/her desired file-transfer operation from the new storage area as the desired transfer source to his/her desired transfer destination. In such a case, the user activates the image file transfer setting unit 30 to initially display an initial window as shown in FIG. 2(a) on the display unit 40.

Figure 2B:
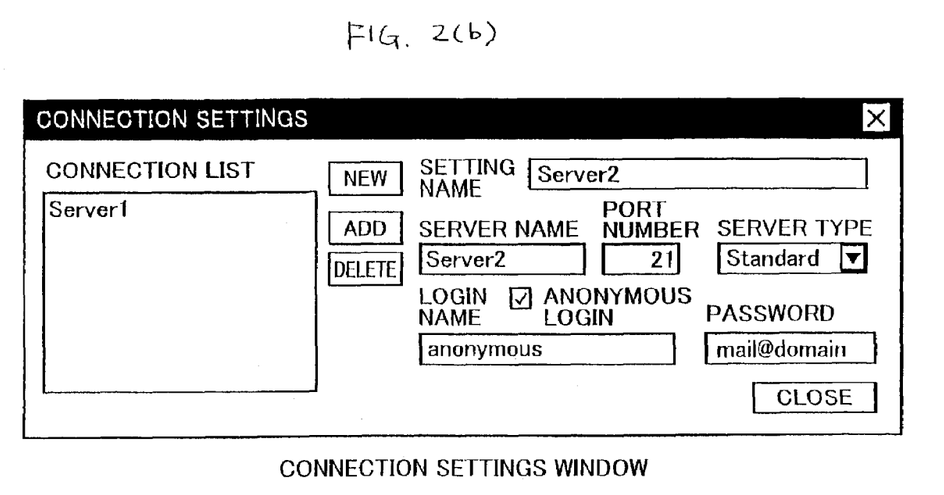
FIG. 2(b) shows a connection settings window.

If the user installs the new folder in a new image server 10 that is newly and additionally connected to the network 2, the user has to set authentication data for accessing the new image server 10. Accordingly, he/she performs a mouse click on the button "Connection Settings" on the initial window of FIG. 2(a). As a result, the image file transfer setting unit 30 starts executing a connection data setting process of FIG. 3 by displaying a connection settings window as shown in FIG. 2(b).

It is now assumed that only the server #1 has already been connected to the network 2 and authentication data for "Server #1" has already been set, and that the server #2 is newly added to the network 2 and therefore that the user now desires to set authentication data for the new server #2. In such a case, as shown in FIG. 2(b), "Server1" is displayed in a list of settings in the window.

Figure 3:
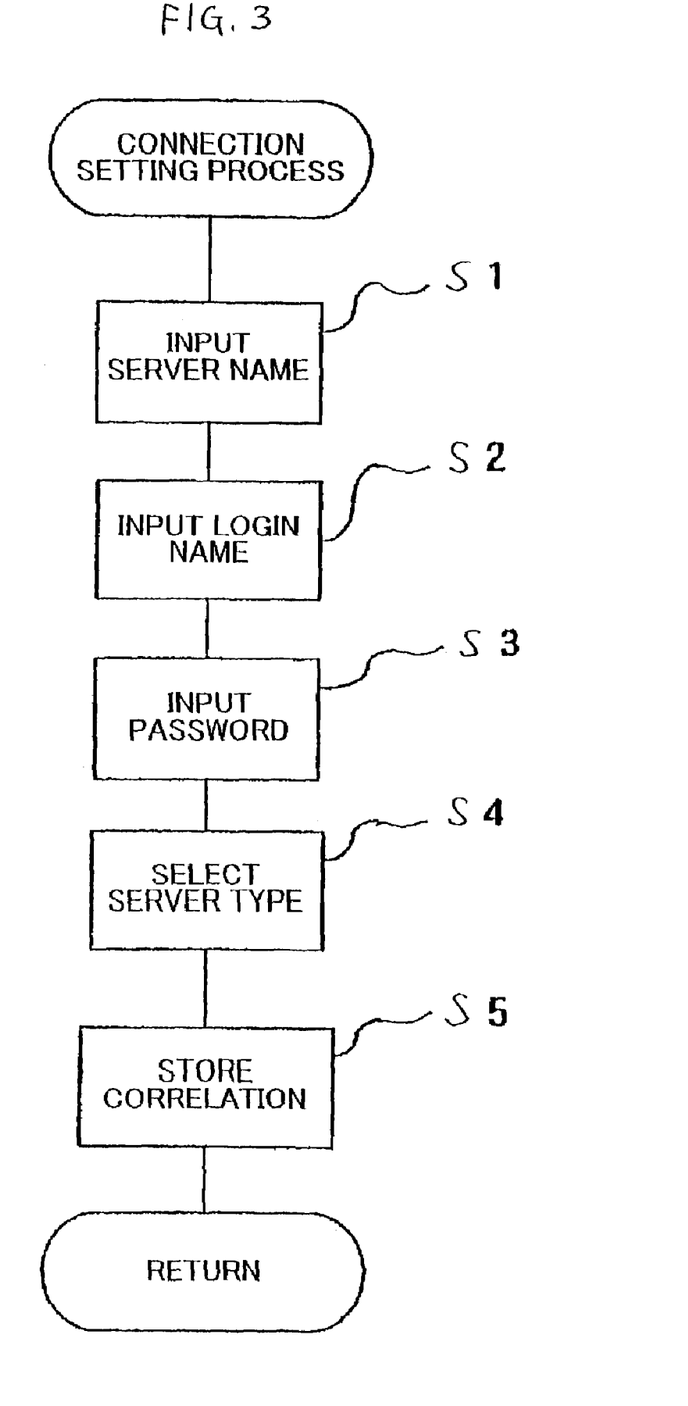
FIG. 3 is a flowchart showing a process for setting connection data executed by the image file transfer setting unit of the preferred embodiment.

Accordingly, after clicking the "New" button, the user inputs in S1 the server name "Server2" in the space "Setting Name" using the input unit 42. It is noted that the image file transfer setting unit 30 determines the address of each image file server 12 by referring to its server name. Accordingly, in this case, the image file transfer setting unit 30 will determine the address of the new image file server #2 by referring to the presently-inputted server name. Also in S1, the user inputs the port number in the space "Port". The image file transfer data setting device 30 determines the type of protocol that corresponds to the inputted port number.

In S2, the user inputs the login name in the space "Login Name".

In S3, the user inputs the password in the space "Password".

In this example, the user inputs "Server2" as the "Server Name," "21" as the "Port," "anonymous" as the "Login Name," and "mail@domain" as the "Password."

Next, in S4, the user selects the type of the image file server #2 from a pull-down list. In this example, the user selects "Standard". Also in S4, if the user wishes to login anonymously, the user checks the box next to "Anonymous Login".

After input has been completed, the user clicks the "Add" button. As a result, the program proceeds to S5, in which the image file transfer setting unit 30 stores the newly inputted and determined data together in association with the inputted setting name as newly-set authentication data in the hard disk 23 or the like.

The thus newly-set authentication data includes: server address data; login name data; password data; and protocol data. In this way, the authentication data not only includes server address data, login name data, and password data but also includes data of the type of protocol desired to be used by the transfer source (image file server 10).

It is noted that the image file transfer data setting device 30 can determine not only the protocol type but also "Version" of the protocol type dependently on the user's inputted port number. Accordingly, the authentication data can additionally include the version of the protocol desired to be used by the transfer source (image file server 10).

By clicking on "Close," the window of FIG. 2(b) closes and the user is returned to the initial window of FIG. 2(a).

After setting the authentication data for the new image server 10, the user clicks the "New" button in the initial window of FIG. 2(a) in order to set new file transfer data. As a result, the image file transfer setting unit 30 starts executing a file transfer data setting process of FIG. 4 by displaying a file transfer setting window shown in FIG. 2(c).

Figure 4:
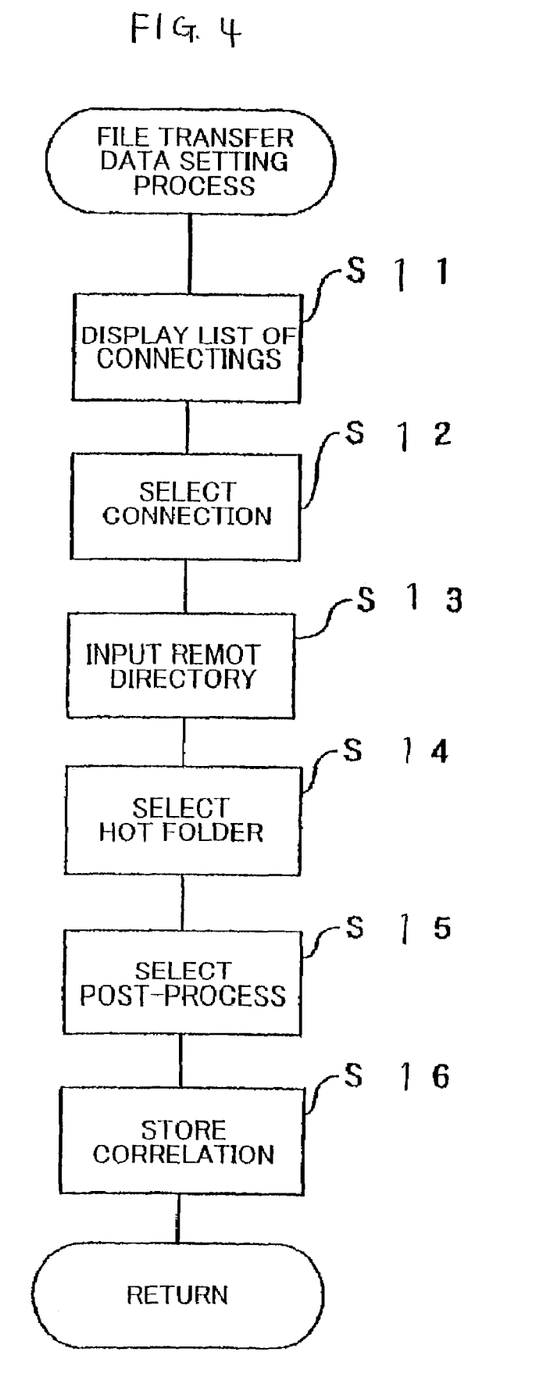
FIG. 4 is a flowchart showing a process for setting file transfer data executed by the image file transfer setting unit.

It is noted that if the user installs the new folder 12 on the image server that has already existed in the network 2, the user does not execute the connection setting process of FIG. 3, but executes the file transfer data setting process of FIG. 4 only.

Figure 2C:
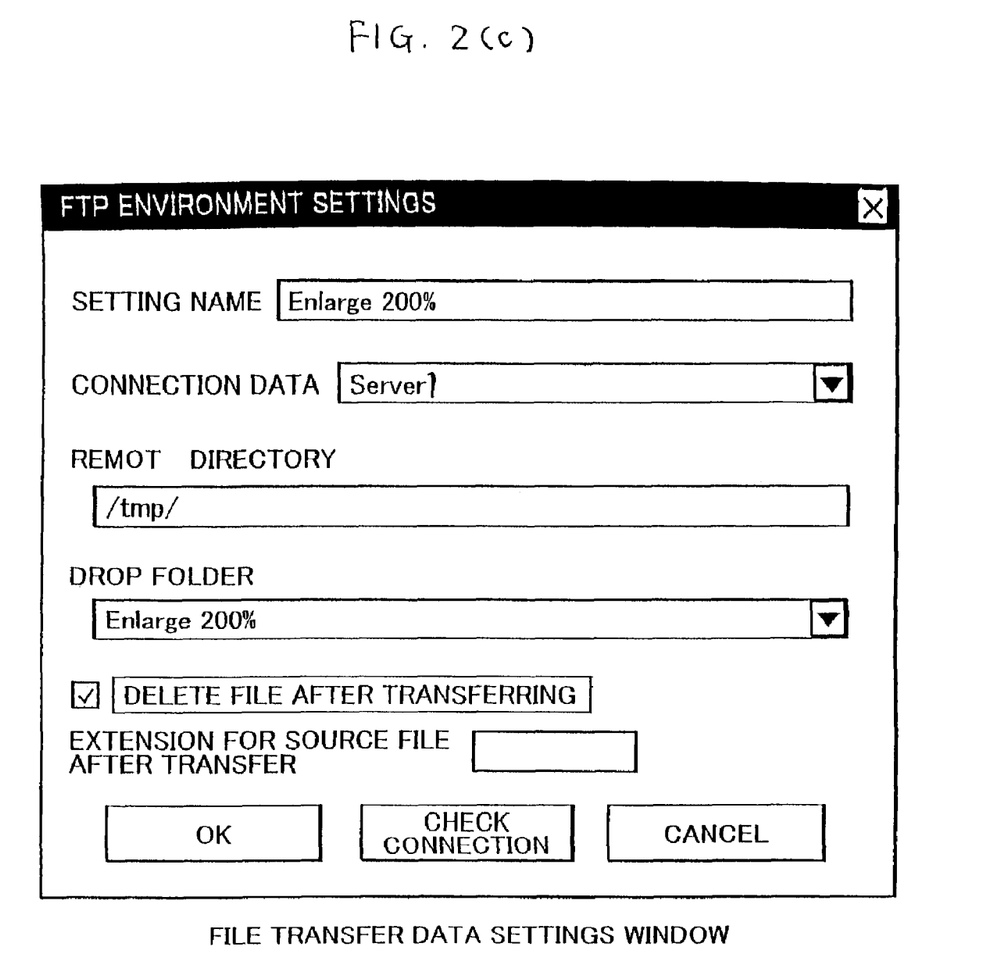

It is now assumed that the user desires to set the setting name "Enlarge 200%" for the new file transfer data. The user therefore first inputs "Enlarge 200%" in the space for the "Setting Name."

Figure 2D:
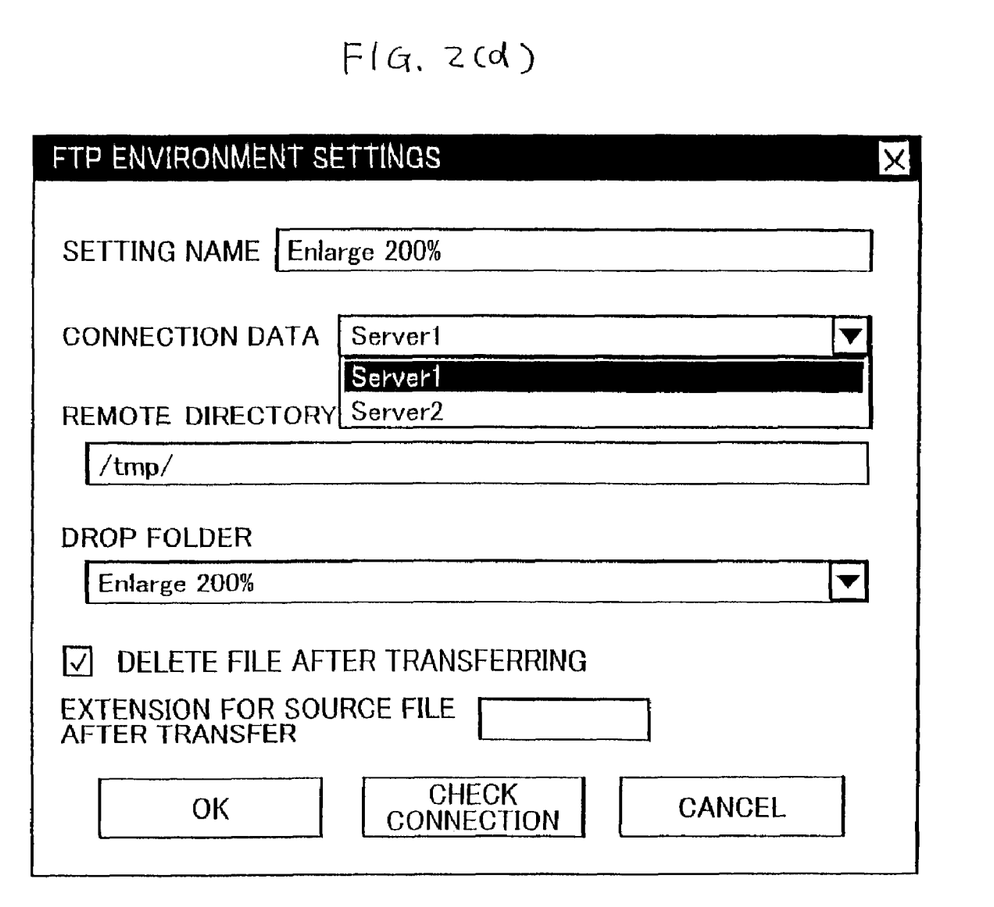
FIG. 2(d) shows how a pull-down list for connections is displayed on the processs window of FIG. 2(c)
Figure 2E:
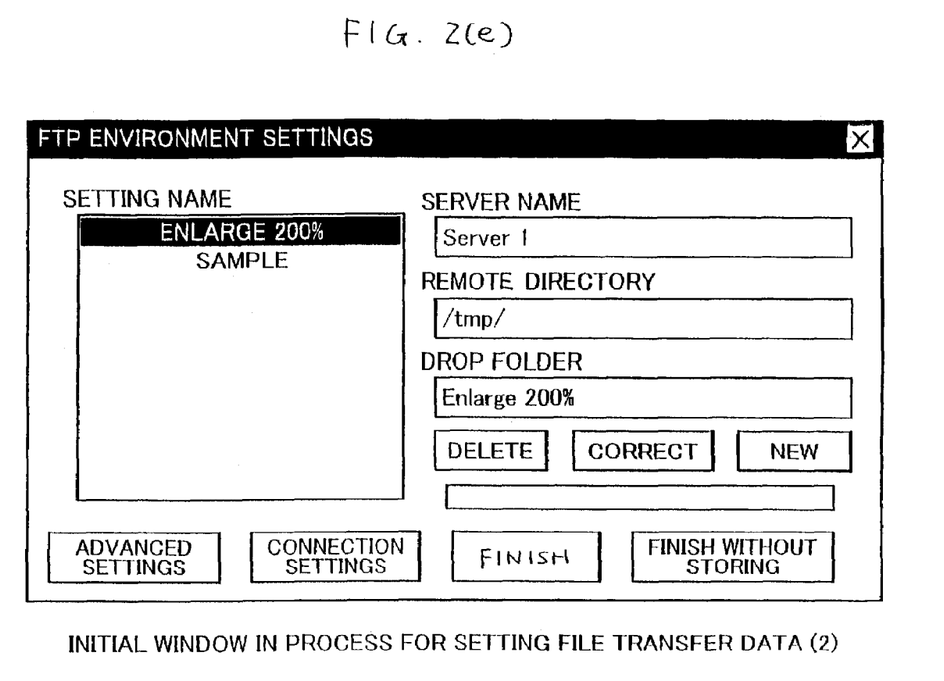
FIG. 2(e) shows the initial window displayed after completing settings.
Figure 5:
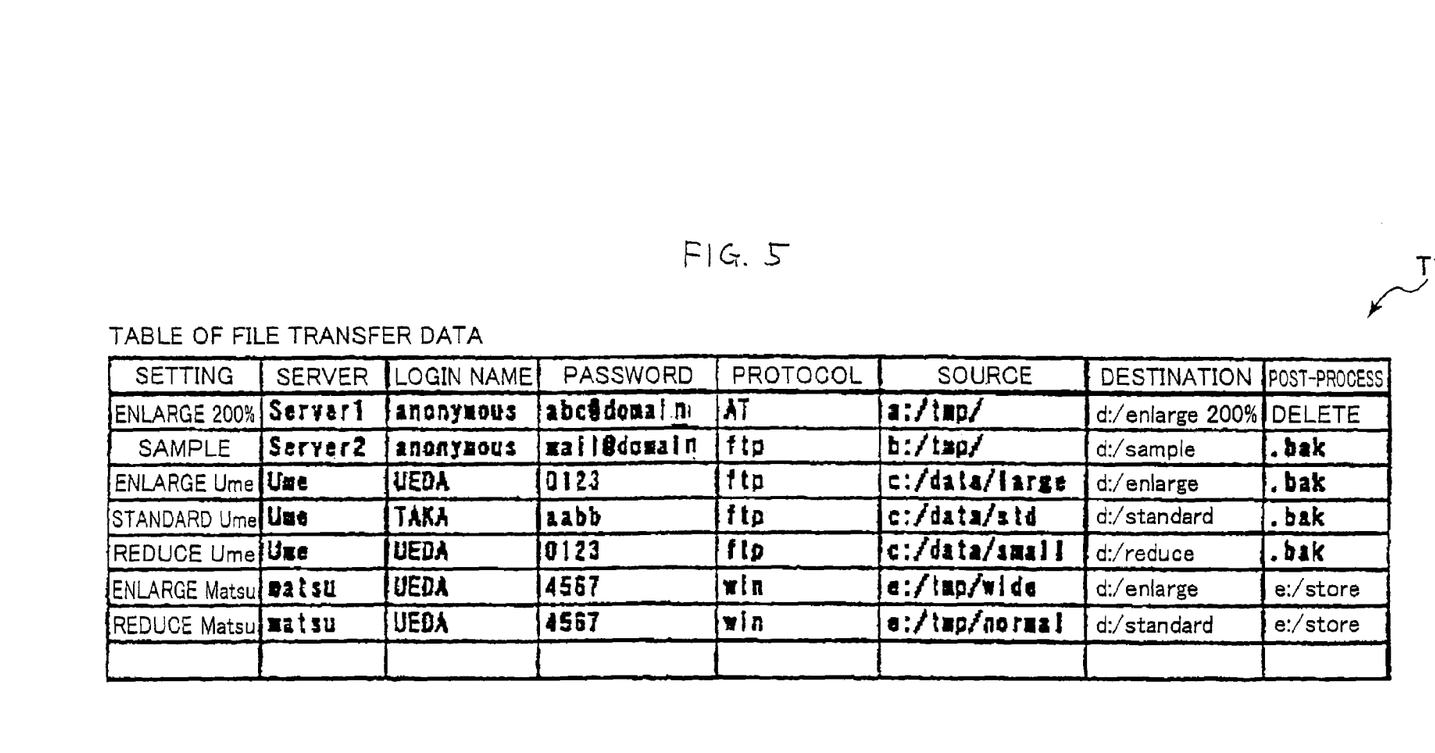
FIG. 5 is an explanatory diagram showing entries in a table for file transfer data stored by the image file setting unit.

When the user clicks the pull-down list button on the right side of the "Connection" space, the image file transfer setting unit 30 refers to the file transfer data table T1 of FIG. 5, and displays in S11 a pull-down list of connections under "Connections" as shown in FIG. 2(d). In the pull-down list, the image file transfer setting unit 30 displays the server names of all the servers, whose authentication data has already been set in the file transfer data table T1. It is now assumed that the table T1 is presently storing authentication data for two servers "Server #1 " and "Server #2", although FIG. 5 shows the case where the table T1 stores authentication data for four servers "Server #1", "Server #2", "Ume", and "Matsu". In such a case, the pull-down list shows the server names of the two servers "Server #1" and "Server #2" as shown in FIG. 2(d).

Next, in S12, the user selects a desired server name from the list of connections displayed in the "Connections" pull-down menu. In this example, the user selects "Server1". As a result, the image file transfer setting unit 30 sets, for the new file transfer data, authentication data for the server #1 that has already been set during the connection data setting process of FIG. 3.

Next, in S13, the user inputs, into the "Remote Directory" space, a remote directory indicative of one of the folders 12 as the desired source of transfer. In this example, the user enters "/tmp/".

In S14, the image transfer data setting unit 30 displays, in the "Drop Folder" pull-down list, a list of all the hot folders 24 already set in the table T1 of FIG. 5. The user selects a desired folder indicative of one of the hot folders 24 as the desired destination of transfer from the list of folders 24. In this example, the user selects "Enlarge 200%".

Next, in S15, the user selects a post-process setting to determine how the image file remaining in the remote directory (transfer source) will be treated after the image file is transferred from the remote directory 12 to the drop folder 24. For example, the user can enter an extension, such as ".bak," in the space "Extension for source file after transfer". In such a case, the original file will be renamed with the extension ".bak" after the transfer of the subject file is completed, which will avoid confusing this file with the image file that has been transferred. Or, the user can check the box next to "Delete file after transferring." In such a case, the source file will be deleted after the transfer of the subject file is completed.

After completing input, the user clicks on the "OK" button to set the new file transfer data as shown in FIG. 2(*e*). As a result, the program proceeds to S16, in which the image file transfer setting unit 30 stores the inputted data as a new entry into the file transfer data table T1 of FIG. 5. The newly-set file transfer data is stored in the table T1 in a manner that its constituent setting name data, transfer source data, transfer destination data, post-process data, and authentication data (server address data, login name data, password data, and protocol data) are stored in association with each other.

In this way, the file transfer data includes data of the type of protocol desired to be used by the transfer source (image file server 10) as a part of the authentication data. The file transfer data can additionally include the version of the protocol desired to be used by the transfer source as a part of the authentication data. It is possible to expand the application scope of the image file transfer data setting device 30.

As shown in FIG. 5, the folders 12 and the hot folders 24 are associated with such functions as enlarged printing, standard printing, and the like. Accordingly, it is unnecessary to set details of the transfer source and destination each time an image file is to be transferred. It is ensured that image files transmitted from specific folders 12 to specific hot folders 24 will be automatically printed in specific printing manners.

It is noted that when the user clicks on "Advanced Settings" in the initial window of FIG. 2(*a*), an advanced settings window is displayed as shown in FIG. 2(*f*). On the advanced settings window, the user can input such settings as "Required disk space", "Polling time," and "Transfer Mode". The user can input his/her desired fixed-capacity space amount S in the space "Required disk space". The user can input his/her desired waiting-time period W in the space "Polling time."

Figure 2F:
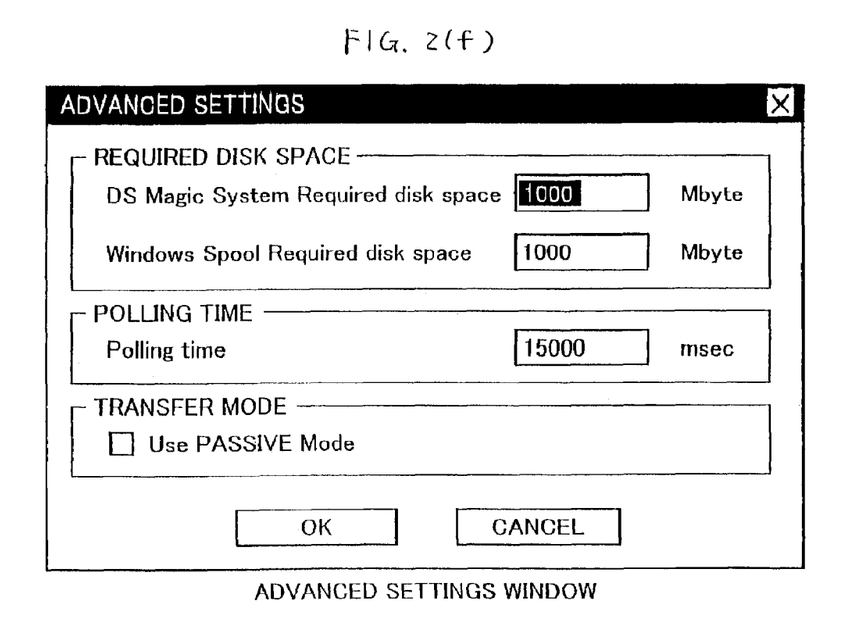
FIG. 2(f) shows an advanced settings window.

If the user checks the "Use passive mode" box under "Transfer Mode", the image file will be transferred from the transfer source to the transfer destination at a high speed. When this box is unchecked, the file will be transferred at a standard rate. In this way, the file transfer data can also include data of the operating mode desired to be used by the transfer source (image file server 10) as a part of the authentication data of the transfer source.

It is noted that the user has to know the login name or the password in order to set his/her desired authentication data during the connection data setting process of FIG. 3. However, the user can set his/her desired file transfer data during the file transfer data setting process of FIG. 4 even if he/she does not know the login name or the password. Accordingly, a system manager of the entire system 1, who knows the login name and the password, controls the image file transfer setting device 30 to execute the connection data setting process of FIG. 3. An operator, who does not know the login name or the password, can control the image file transfer setting device 30 to execute the file transfer data setting process of FIG. 4. In S11, only the server names from among the authentication data of the servers are displayed on the pull-down list. The login names or passwords are not displayed. This prevents the operator from knowing the login names or passwords of the servers. It is possible to improve the security of the login names and passwords. It is possible to easily manage the login names and passwords.

In the above description, in S13, the user inputs his/her desired remote directory set into the "Remote Directory" space. However, the image file transfer setting unit 30 may display a list of folders 12 that have been already stored in the table T1 so that the user can select in S13 his/her desired source folder 12 from the list of folders.

Similarly, in the above description, the image file transfer setting unit 30 displays in S14 the "Drop Folder" pull-down list so that the user can select his/her desired destination folder 24 from the list of folders. However, the image transfer data setting unit 30 may not display such a list in S14, but the user may simply input his/her desired client directory set into the "Drop Folder" space.

In the above description, the display unit 40 displays the pull-down list as shown in FIG. 2(*d*) in S11 to notify the user of the already-recorded server names. However, another method for notifying the user of the already-recorded server names is possible. For example, the already-recorded server names may be verbally reported by a speaker or the like (not shown) which is provided to the file transfer data setting device 30. There are a variety of methods that can be used for notifying the user of the already-recorded server names.

As described above, according to the present embodiment, in order for the user to set new file transfer data, the image file transfer setting unit 30 acquires authentication data from the file transfer data table T1 and displays a list of connections on the display unit 40 in S11. The user uses the input unit 42 to select a desired connection from the list in S12. The user also uses the input unit 42 in S13 and S14 to input or select a folder 12 as the transfer source and a hot folder 24 as the transfer destination. The image file transfer setting unit 30 combines this data as new file transfer data and adds the data to the file transfer data table T1 in S16.

Hence, the user can set new file transfer data using authentication data included in preset file transfer data. Accordingly, it is no longer necessary for the user to record such data in his/her notebook or the like, and the user need not perform such troublesome operations as inputting the authentication data each time via the keyboard or the like. Accordingly, it is possible to facilitate the setting of file transfer data and the management of the server authentication data.

Further, the image file transfer setting unit 30 can perform post-process settings to determine how image files remaining in the folder 12 will be handled after the image files have been transferred from the folders 12 to the hot folders 24, using such settings as deleting the files, changing the extension on the files, or the like according to the user's needs. It is also desirable to include a setting for moving the image file to another folder 12.

The image file transfer controller 31 controls transfer of image files from folders 12 to the hot folders 24. In order to determine whether or not to transfer an image file from a transfer source 12 to a destination 24 according to one set of file transfer data stored in the file transfer data table T1, the free space determining unit 28 first calculates the required capacity C based on the size of the subject image file to be transferred and the fixed-capacity space amount S. The size of the image file is the amount of data contained in the image file. The fixed-capacity space amount S has already been set on the "Advanced Settings" window of FIG. 2(f) by the image file transfer setting unit 30.

More specifically, the free space determining unit 28 calculates the amount of the required capacity C as a sum of the size of the subject image file and the fixed-capacity space amount S. The thus calculated required capacity C indicates the amount of free space 26 that is required to smoothly process the subject image file to be transferred.

The free space determining unit 28 then determines whether the present capacity or amount of the work area 26 is greater than or equal to the required capacity C. That is, the free space determining unit 28 compares the present capacity of the work area (free space) 26 with the required capacity C. In other words, the free space determining unit 28 compares, with the fixed-capacity space amount S, the capacity that the free space 26 will possess when the subject image file is stored in some hot folder 24 in the hard disk 23.

When the free space determining unit 28 determines that the capacity of the work area 26 is greater than or equal to the required capacity C, the FTP client 22 issues a transfer request to the FTP server 14 of the image file server 10, designated by the file transfer data, to transfer the subject image file based on the file transfer data. Upon receiving the transfer request, the FTP server 14 performs the image file transfer based on the file transfer data, so that the image file is transferred from a transfer source folder 12 as designated by the file transfer data to a transfer destination hot folder 24 as also designated by the file transfer data. Next, the image processing unit 32 extracts the transferred image file that is now being stored in the hot folder 24, and processes the image file using the work area 26.

The printer 38 is connected to the image processing device 20 via the printer interface 34. The image file processed by the image processing device 20 is transferred to the printer 38 via the printer interface 34 and printed by the printer 38.

It is noted that the printer 38 can be connected to the network 2 and that the image processing device 20 can be connected to the printer 38 via the network 2 other than via the printer interface 34.

Figure 6:
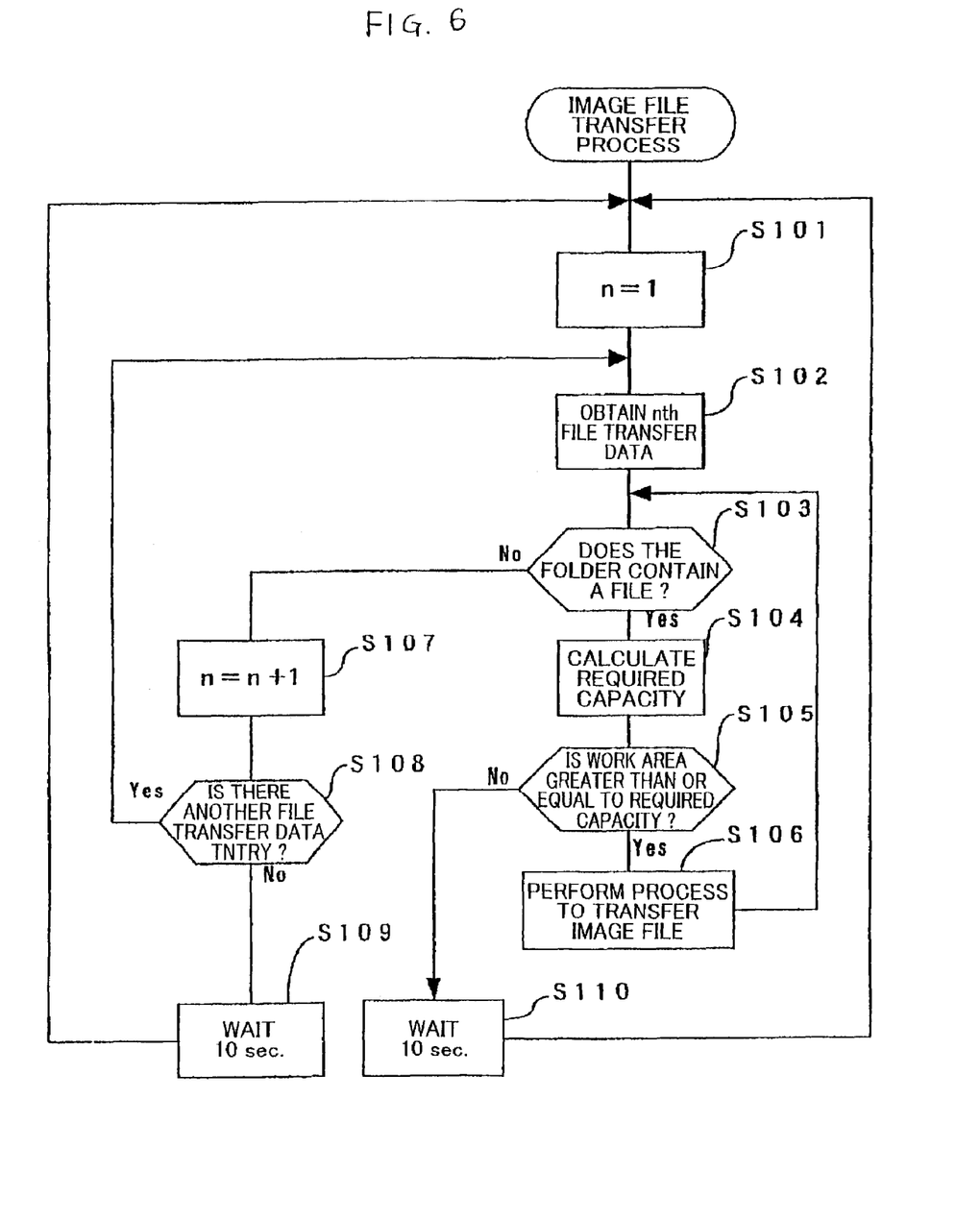
FIG. 6 is a flowchart showing an image file transferring process executed by an image file transfer controller in the image processing system of FIG. 1.

Next, the image file transfer process executed by the image file transfer controller 31 will be described with reference to the flowchart of FIG. 6.

In S101, a variable n is initialized to 1.

In S102, the nth entry of file transfer data is extracted from the file transfer data table T1 of FIG. 5. Here, n is equal to one (1) on the first instance.

In S103, the image file transfer controller 31 accesses one image file server 10 that is indicated by the server name (address) in the extracted nth entry of file transfer data. The image file transfer controller 31 accesses the image file server 10 by using the authentication data listed in the nth entry file transfer data, and receives authentication or permission from the image file server 10. The image file transfer controller 31 determines whether an image file exists in a folder 12 that is indicated by the transfer source data listed in the nth entry file transfer data and that is located on the subject image file server 10.

If some image file exists in the subject folder 12 (yes in S103), then the image file transfer controller 31 calculates the required capacity C in S104 by adding the size of the subject image file and the fixed-capacity space amount S. Then, the process advances to S105.

On the other hand, if no image file exists in the subject folder 12, then the process advances to S107 as described later.

In S105, the image file transfer controller 31 determines whether the present capacity of the work area 26 is greater than or equal to the required capacity C. If the work area 26 is greater than or equal to the required capacity C (yes in S105), the process advances to S106.

In S106 a process is executed to transfer the image file from the subject folder 12 to a hot folder 24 that is indicated by a transfer destination data listed in the nth entry file transfer data. More specifically, the FTP client 22 issues a transfer request to the FTP server 14 of the subject image file server 10 to transfer the image file based on the nth entry of file transfer data. Upon receiving this file transfer request, the FTP server 14 executes the file transfer based on the nth entry of file transfer data.

After the transfer is complete, the original image file may be deleted from the folder 12, renamed with a different extension, or the like, according to the post-process data in the nth entry file transfer data. The image file transferred to the hot folder 24 will undergo a series of image process by the image processing unit 32 in a manner described later.

Subsequently, the process returns to S103, where the image file transfer controller 31 again determines whether another image file exists. Since the image file no longer exists at this time (no in S103), the process advances to S107.

In S107, the variable n is incremented 1. In S108 the image file transfer controller 31 determines whether an nth entry of file transfer data exists in the file transfer data table TF. If the file transfer data exists, the process returns to S102, and the steps from S102 are repeated for the next file transfer data. On the other hand, if the value of the variable n is larger than the total number of file transfer data entries in the file transfer data table TF, then the process advances to S109.

In S109, the image file transfer controller 31 pauses for a waiting time, after which the processes beginning from S101 are repeated. It is noted that the length of the waiting time is equal to the waiting-time period W that has been set on the "Advanced Settings" window of FIG. 2(f) by the image file transfer setting unit 30. In this example, the waiting-time period W is set to 10 seconds.

On the other hand, if the work area 26 is less than the required capacity C in S105 (no in S105), transfer of an image file is not allowed, and the process advances to S110. As in S109, the image file transfer controller 31 pauses for the waiting time of the waiting-time period W in S110 before repeating the process from S101.

It is noted that the fixed-capacity space amount S and the waiting-time period W are set to predetermined values if the user does not set his/her desired values on the "Advanced Settings" window.

It is noted that the processes of S103 and S106 are executed by the FTP client 22, and the processes of S104 and S105 are executed by the FTP client 22 and the free space determining unit 28.

Figure 7:
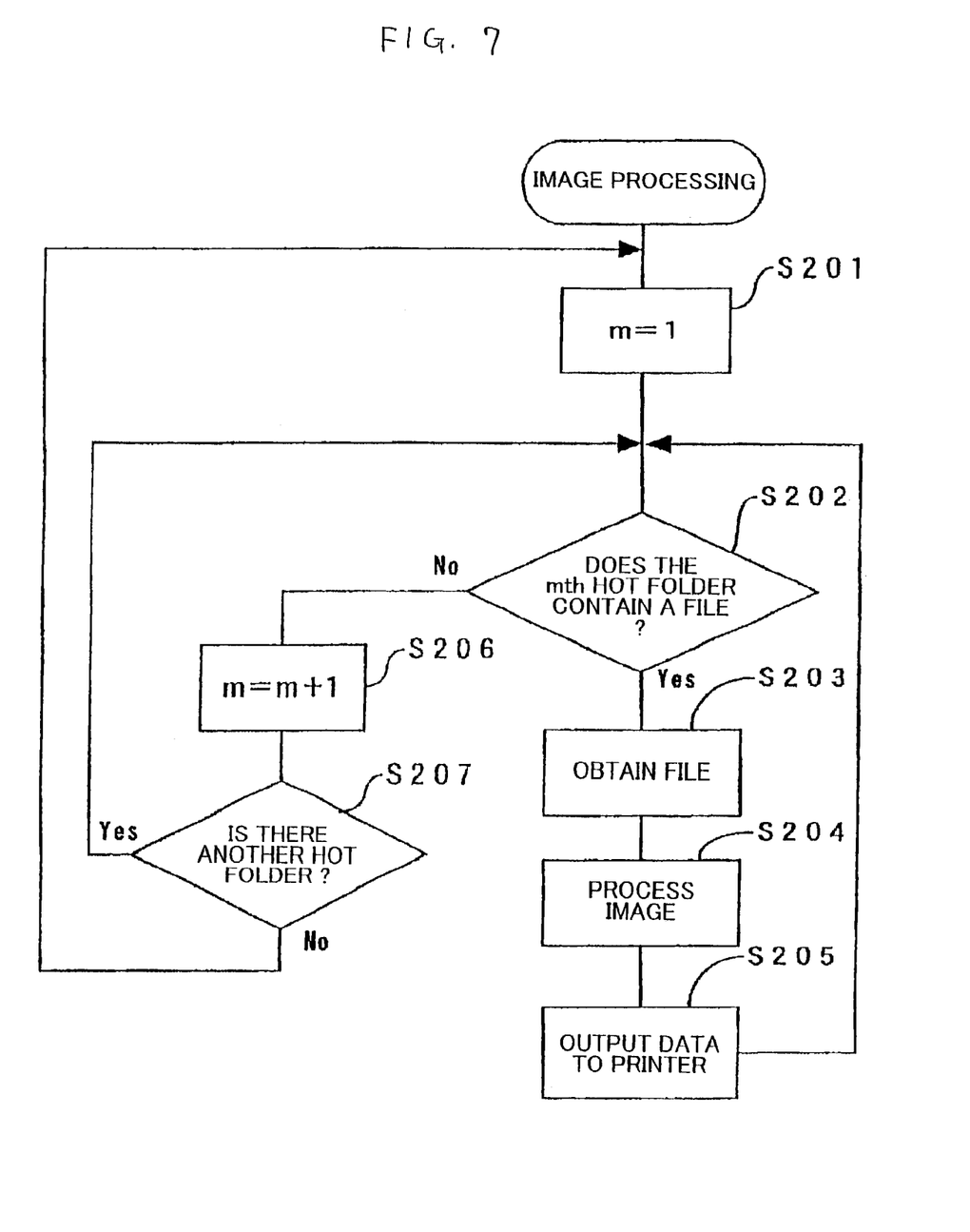
FIG. 7 is a flowchart showing an image process executed by an image processing device in the image processing system of FIG. 1.

Next, image processing performed by the image processing unit 32 will be described with reference to the flowchart of FIG. 7.

In S201, a variable m is initialized to 1.

In S202, the image processing unit 32 determines whether an image file exists in the mth hot folder 24. If an image file exists in the mth hot folder 24 (yes in S202), then the program proceeds to S203.

In S203, the image processing unit 32 extracts the image file from the mth hot folder 24.

In S204, the image processing unit 32 processes the extracted image file using the work area 26.

In S205 the image processing unit 32 transfers the processed image file to the printer 38, where the image file is printed. At this time, the processed image file and the unprocessed image file remaining in the hot folder 24 are deleted. Similarly, in the printer 38, the processed image file is deleted after being printed.

Next, the process returns to S202, where the image processing unit 32 confirms again whether some image file exists in the mth hot folder 24. Since the image file has been processed and then deleted, no image file exists at this time, and therefore the process advances to S206.

In S206 the variable m is incremented 1.

In S207, the image processing unit 32 determines whether an mth hot folder 24 exists in the image processing device 20. If the mth hot folder 24 exists, then the process returns to S202, and the processes beginning from S202 is repeated for the next hot folder 24.

On the other hand, if the value of the variable m is larger than the total number of hot folders 24, then the image processing unit 32 returns to S201 and repeats the above processes.

In the above description, the image processing system 1 is used to transfer and process image files. However, the image processing system 1 can be modified to transfer and process all types of data files, such as document files.

As described above, according to the present embodiment, when an image file exists in the folder 12 indicated to be the transfer source by the nth file transfer data, the free space determining unit 28 determines whether the work area 26 in the hard disk 23 meets or exceeds the required capacity C. If the work area 26 meets or exceeds the required capacity C, then the image file transfer process is executed. More specifically, the FTP client 22 requests an FTP server 14, which is located in an image file server 10 that includes the folder 12 indicated to be the transfer source by the nth entry of file transfer data, to transfer the image file. As a result, the image file in the folder 12 indicated to be the transfer source by the nth entry of file transfer data is transferred to the hot folder 24 that is indicated to be the transfer destination by the nth entry of file transfer data. Accordingly, it is ensured that the work area 26 required for image processing is reliably allocated in the hard disk 23 on which the hot folder 24, serving as the transfer destination, is located. Image processing can be performed without disruption, thereby increasing the stability of the image processing.

Further, when an image file does not exist on the folder 12 indicated as the transfer source in the nth entry of file transfer data, a process of S103 is not executed to determine whether the work area 26 meets or exceeds the prescribed capacity. In addition, since the image file transfer process is resumed after pausing for the waiting time following completion of the previous image file transfer process, the processing load on the FTP client 22 is reduced.

As described above, when a new storage area is installed in a server 10, for example, it becomes necessary to set new file transfer data. In such a case, the display unit 40 reports to the user a part of the authentication data (server name, in this example) within the file transfer data already stored in the file transfer data table T1. Upon receiving this report, the user selects his/her desired server name, thereby selecting his/her desired server. The user further selects a storage area 12 on the server 10 as the source of the file to be transferred and a storage area 24 on the client as the destination for the file. It is noted that the user can operate the keyboard or the like 42 to input such data as an address for the server storage area and client storage area. Or, the user can select data for the server storage area and client storage area reported by the display unit 40.

The image file transfer setting unit 30 accepts the user's selected server, data for the server storage area, and data for the client storage area. The image file transfer setting unit 30 associates together the already-stored authentication data for the selected server, data for the server storage area, and data for the client storage area as new file transfer data, and stores the data in the file transfer data table T1. In this way, the user can set new file transfer data using at least the authentication data from among the previously-stored file transfer data. Accordingly, it is no longer necessary for the user to record such data in a notebook or the like or to go through the troubling process to input this authentication data via a keyboard each time the data is required. It is desirable that the display unit 40 reports data from the file transfer data other than the authentication data so that the reported data can be selected by the user. It is possible to facilitate the setting of file transfer data and the management of server authentication data. By configuring the display unit 40 to display a list of authentication data and the like, the setting of file transfer data can be facilitated.

It is noted that authentication data includes all items necessary for receiving authentication from a server at which the transfer source is located. Authentication data can include the address of the server at which the transfer source is located, the user's login name, and a password. In the above-described embodiment, the display unit 40 displays only the server name that indicates the server address, thereby ensuring the security of the login name and the password.

The authentication data may also include data related to the protocol used by the transfer source, such as the protocol type, operating mode, and version of the protocol, thereby expanding the application scope of the file transfer data setting unit 30.

It is necessary to set options for files that will be left in the source folder on the server after the file is transferred to a destination client. In the file transfer data setting unit 30, the file transfer data includes post-process data related to processing of files remaining in the transfer source folder after the files have been transferred. Accordingly, it is possible to determine how such files are treated, for example, whether to delete or rename the files, to move the files to a different storage area, or the like according to the needs of the user.

While the invention has been described in detail with reference to the specific embodiment thereof, it would be apparent to those skilled in the art that various changes and modifications may be made therein without departing from the spirit of the invention.

For example, in the above-described embodiment, the network 2 is a wired network. However, the network 2 is not limited to the wired network, but may be a wireless network, such as a wireless LAN.

In the above description, the image processing device 20 (client) including the built-in image file transfer setting unit 30 is connected to the network 2, but the present invention is not limited to this construction. For example, the image file transfer setting unit 30 may be built into the image file server 10. Further, both the image file transfer setting unit 30 and image processing device 20 may be provided in the printer 38. The image file transfer setting unit 30 may also exist as a standalone unit that is connected to the network 2. In this way, the file transfer data setting unit 30 can be provided as a standalone unit or can be included in a client or server in the file transfer system.

The file transfer data setting unit 30 can be implemented via a variety of methods. In the above-described embodiment, the file transfer data setting unit 30 is implemented by executing the application programs of FIGS. 3 and 4 on the computer that realizes the image processing device 20. More specifically, the programs are provided to direct the computer to function as the file transfer data setting unit 30. The file transfer data setting unit 30 is implemented by having the computer execute the programs.

The programs for directing the computer to function as the file transfer setting unit 30 can be originally recorded on a storage medium that can be read by a computer, such as a flexible disk D shown in FIG. 1, a magneto-optic disk, a CD-ROM, or a hard disk.

By loading these programs stored on the storage medium according to need onto the computer and executing the programs, the file transfer setting unit 30 can be implemented on the computer system.

In addition, it is possible to record the program on a storage medium, such as a ROM or backup RAM that can be read by the computer. This ROM or backup RAM can be built into the computer. Or otherwise, the programs can be installed on the computer via a communication line.

In the above description, only the server name (server address) among the authentication data is displayed in S11. However, other components in the authentication data may be displayed in S11. The entire authentication data may be displayed in S11.

What is claimed is:

1. A file transfer data setting device for setting file transfer data to be used for transferring a file from one of at least one server to a client, the file transfer data setting device comprising:
   a storing portion storing at least one set of file transfer data, each set of file transfer data including a set of transfer source data, a set of transfer destination data, and a set of server authentication data, the transfer source data set indicating a server storage area that is provided on the one of the at least one server and that serves as a source of a file to be transferred, the transfer destination data set indicating a client storage area that is provided on a client and that serves as a destination to transfer the file, the server authentication data set being used for causing the server to permit an access to the server;
   a notifying portion notifying a user of at least one set of information indicative of the at least one set of server authentication data that is included in the at least one set of file transfer data stored by the storing portion, each set of information including at least a part of a corresponding set of server authentication data;
   an input portion enabling a user to input a set of transfer source data indicating a user's desired server storage area, from which the user desires to transfer a file, and to input a set of transfer destination data indicating a user's desired client storage area, to which the user desires to transfer the file, the input portion enabling the user to select one set of information from among the at least one set of information notified by the notifying portion, thereby selecting one set of server authentication data that corresponds to a user's desired server, in which the user's desired server storage area is located; and
   a file transfer data setting portion adding the selected authentication data, the inputted transfer source data, and the inputted transfer destination data in association with each other in the storing portion as a set of new file transfer data;
   wherein the input portion enables the user to further input post-process data indicative of a desired post-processing, to which the user desires to subject the file that will remain in the user's desired server storage area after the subject file is transferred from the server storage area to the user's desired client storage area, and
   wherein the file transfer data setting portion adds the selected authentication data, the inputted transfer source data, the inputted transfer destination data, and the inputted post-processing data in association with each other in the storing portion as the set of new file transfer data.

2. A file transfer data setting device as recited in claim 1, wherein the notifying portion notifies the user of the at least one set of transfer destination data that is included in the at least one set of file transfer data stored by the storing portion, the input portion enabling the user to select one set of transfer destination data indicating the user's desired client storage area, the file transfer data setting portion adding the selected authentication data, the inputted transfer source data, and the selected transfer destination data in association with each other in the storing portion as the set of new file transfer data.

3. A file transfer data setting device as recited in claim 2, wherein the notifying portion notifies the user of at least one set of transfer source data that is included in the at least one set of file transfer data stored by the storing portion, the input portion enabling the user to select one set of transfer source data indicating the user's desired server storage area, the file transfer data setting portion adding the selected authentication data, the selected transfer source data, and the selected transfer destination data in association with each other in the storing portion as the set of new file transfer data.

4. A file transfer data setting device as recited in claim 1, wherein the notifying portion includes a display portion displaying a list of the at least one set of information indicative of the at least one set of authentication data that is included in the at least one set of file transfer data stored by the storing portion.

5. A file transfer data setting device as recited in claim 1, wherein the authentication data for each of the at least one server includes address-indicating data, login name data, and password data, the address-indicating data being indicative of an address of the server, the notifying portion setting each set of information indicative of the corresponding set of server authentication data based on the address-indicating data included in the corresponding set of server authentication data, thereby notifying the user only of the address-indicating data in the authentication data for each of the at least one server, without notifying the user of login name data and the password data in the authentication data.

6. A file transfer data setting device as recited in claim 1, wherein the authentication data for each of the at least one server further includes data indicative of a protocol used by the server.

7. A storage medium that can be read by a computer and that stores a file transfer data setting program to be executed by a computer for setting file transfer data to be used for transferring a file from one of at least one server to a client, the computer including a storing portion storing at least one set of file transfer data, each set of file transfer data including a set of transfer source data, a set of transfer destination data, and a set of server authentication data, the transfer source data set indicating a server storage area that is provided on the one of the at least one server and that serves as a source of a file to be transferred, the transfer destination data set indicating a client storage area that is provided on a client and that serves as a destination to transfer the file, the server authentication data being used for causing the server to permit an access to the server, the file transfer data setting program comprising the programs of:

notifying a user of at least one set of information indicative of the at least one set of server authentication data that is included in the at least one set of file transfer data stored by the storing portion, each set of information including at least a part of a corresponding set of server authentication data;

enabling a user to input a set of transfer source data indicating a user's desired server storage area, from which the user desires to transfer a file, to input a set of transfer destination data indicating a user's desired client storage area, to which the user desires to transfer the file, and to select one set of information from among the notified at least one set of information, thereby selecting one set of server authentication data that corresponds to a user's desired server, in which the user's desired server storage area is located; and adding the selected authentication data, the inputted transfer source data, and the inputted transfer destination data in association with each other in the storing portion as a set of new file transfer data, wherein the enabling enables the user to further input post-process data indicative of a desired post-processing. to which the user desires to subiect the file that will remain in the user's desired server storage area after the subi ect file is transferred from the server storage area to the user's desired client storage area, and wherein the adding adds the selected authentication data, the inputted transfer source data, the inputted transfer destination data, and the inputted post-processing data in association with each other in the storing portion as the set of new file transfer data.

* * * * *